United States Patent [19]

Blair et al.

[11] Patent Number: 5,461,109
[45] Date of Patent: Oct. 24, 1995

[54] WATER-REDUCIBLE GOLF BALL COATING

[75] Inventors: Marvin A. Blair, Bloomfield, Conn.; Richard A. Ford, Grand Rapids, Mich.

[73] Assignee: Guardsman Products, Inc., Grand Rapids, Mich.

[21] Appl. No.: 184,276

[22] Filed: Jan. 21, 1994

[51] Int. Cl.$^6$ .............................. A63B 37/12; C08J 3/05; C08L 75/04
[52] U.S. Cl. ........................................ 524/839; 273/235 A
[58] Field of Search ......................... 524/839; 273/235 A

[56] References Cited

U.S. PATENT DOCUMENTS

| | | | |
|---|---|---|---|
| 2,968,575 | 1/1961 | Mallonee | 106/287 |
| 3,034,791 | 5/1962 | Gallagher | 273/235 |
| 3,412,054 | 11/1968 | Milligan et al. | 260/18 |
| 3,437,624 | 1/1968 | Dawn et al. | 260/29.2 |
| 3,479,310 | 11/1969 | Dieterich et al. | 260/29.2 |
| 3,647,221 | 3/1972 | Holley | 273/235 |
| 3,979,126 | 9/1976 | Dusbiber | 273/218 |
| 3,989,568 | 11/1976 | Isaac | 156/182 |
| 4,046,729 | 9/1977 | Scriven et al. | 260/29.2 |
| 4,068,849 | 1/1978 | DiSalvo | 273/218 |
| 4,123,061 | 10/1978 | Dusbiber | 273/220 |
| 4,141,559 | 2/1979 | Melvin et al. | 273/220 |
| 4,147,679 | 4/1979 | Scriven et al. | 260/29.2 |
| 4,248,432 | 3/1981 | Hewitt et al. | 273/235 |
| 4,268,426 | 5/1981 | Williams et al. | 260/22 |
| 4,442,282 | 4/1984 | Kolycheck | 528/83 |
| 4,507,430 | 3/1985 | Shimada et al. | 524/839 |
| 4,679,794 | 7/1987 | Yamada et al. | 273/235 |
| 4,679,795 | 7/1987 | Melvin et al. | 273/235 |
| 4,798,386 | 1/1989 | Berard | 273/235 |
| 5,000,458 | 2/1991 | Proudfit | 273/235 A |
| 5,018,742 | 5/1991 | Isaac et al. | 273/235 |
| 5,091,265 | 2/1992 | Kennedy et al. | 428/690 |
| 5,194,487 | 3/1993 | Jacobs | 524/591 |
| 5,200,489 | 4/1993 | Jacobs et al. | 528/49 |
| 5,235,018 | 8/1993 | Potter et al. | 528/49 |
| 5,258,482 | 11/1993 | Jacobs et al. | 528/49 |
| 5,286,782 | 2/1994 | Lamb et al. | 524/507 |
| 5,300,325 | 4/1994 | Nealon et al. | 427/379 |
| 5,354,797 | 10/1994 | Anderson et al. | 525/123 |

OTHER PUBLICATIONS

Jacobs, P. B. and Yu, P. C.; "Two–Component Waterborne Polyurethane Coatings"; Journal of Coatings Technology; vol. 65, No. 822, Jul. 1993, pp. 45 . 50.
Cannon Instrument Company, Bulletin 250 (Replaces Bulletins 180, 210 and 233), "Viscosity Standards", 2 pages, not dated.

*Primary Examiner*—Thomas Hamilton, III
*Attorney, Agent, or Firm*—Price, Heneveld, Cooper, DeWitt & Litton

[57] ABSTRACT

A golf ball having a coating of a water-based, water-reducible polyurethane, and a related method of forming a coating on a golf ball which avoids the problems of foaming of the coating. The coating is formed by the addition of a first component comprising a compound having hydroxyl functionality, an organic solvent, an optical brightener and water, to a second component comprising an aliphatic polyisocyanate and an organic solvent. In addition, a method of forming a top coat on a golf ball having a SURLYN® outer layer which avoids the use of a primer coat or adhesion promoting layer is disclosed.

48 Claims, No Drawings

WATER-REDUCIBLE GOLF BALL COATING

BACKGROUND OF THE INVENTION

The present invention relates to a coating for a golf ball. Golf balls are often coated with an outermost protective polyurethane clear coating. Polyurethane systems may be either "one component" systems or "two component" systems. One component systems are generally made up of minute polymeric, reacted or partially reacted particles which are suspended or dispersed in one or more solvents. Curing and subsequent formation of a coating results by evaporation of the solvent(s) and/or addition of a curing agent. Two component systems rely on keeping the primary reactants separate from one another until the time for forming the coating. Upon addition of the reactants to one another, polymerization occurs. In forming a coating, such reaction may be accompanied or followed by evaporation of the solvent(s).

Polyurethane systems may be classified as either water-based or nonaqueous solvent-based systems. Both water-based systems and nonaqueous solvent-based systems may be either one or two component systems. Such nonaqueous systems typically employ relatively high concentrations of one or more organic solvents. In such systems it is generally necessary to exclude water from the reaction environment.

Water-based polyurethane coating compositions offer several advantages over nonaqueous, organic solvent-based systems. Organic solvents are often more expensive than water and often hazardous to work with and so less desirable especially for large scale production operations. Moreover, it is not desirable to store or maintain a supply of organic solvents in view of their relative toxicity and flammability compared to water. In addition, two component water-based systems are generally preferred over one component systems since coatings formed from two component systems generally have superior strength and durability as compared to coatings formed frown one component systems.

Two component water-based polyurethane systems are typically formed from a first component of polyol and water and a polyisocyanate second component. Upon addition of the components to one another and evaporation of water or other solvents from the system, a polymeric urethane coating is formed. Although such two component water-based systems are preferable in many respects to traditional nonaqueous solvent-based systems and one component water-based systems, there are numerous problems in attempting to form a two component, water-based polyurethane top coat on a golf ball.

One problem encountered in forming a polyurethane coating from a two component water-based polyurethane system is that the polyisocyanate readily reacts with water either in the other component or in the surrounding environment, thereby generating carbon dioxide gas which tends to foam the coating. The resulting foamy appearance and rough surface is undesirable and is often accompanied by poor coating properties. Such coatings are unacceptable for use on golf bails. Thus, there is a need for a two component water-based polyurethane golf ball coating which avoids the formation of carbon dioxide or other gaseous agent(s) during formation and application of the coating, and which produces a clear, protective, aesthetically pleasing golf ball top coat.

In addition, it is necessary that any outer coating applied to a golf ball not destroy or significantly alter the particular surface configuration of the golf ball. An outer coating which destroys or significantly alters the surface configuration of a golf ball generally adversely affects the aerodynamics of the ball. Coating compositions which have a relatively high viscosity tend to form coatings having varying thicknesses especially when such coatings are applied onto special irregular surfaces such as that formed into a golf ball. Thus, prior to application of a coating composition to a golf ball, it may be necessary to adjust the viscosity of the composition by addition of a solvent. As noted, it is undesirable to utilize nonaqueous organic solvents in view of their cost, health hazards, toxicity and flammability. In water-based systems, the addition of water promotes time generation of carbon dioxide to produce a foamy coating. Thus, there is a need for a golf ball coating having a viscosity which may be readily adjusted by the addition of water while avoiding foaming.

As far as is known, all golf ball top coats for SURLYN® covered golf balls (the majority of all golf balls currently produced) require a primer coat or adhesion promoting layer deposited on the SURLYN® material. The expense of primer or adhesion promoting materials is undesirable especially in commercial manufacturing operations. In addition, the application of a primer coat or adhesion promoting layer significantly adds to the labor, time, and effort in producing a golf ball. Thus, there is a need for a golf ball top coat for a SURLYN® covered golf ball which does not require a primer coat or adhesion promoting layer.

SUMMARY OF THE INVENTION

The present invention provides a golf ball water-based polyurethane coating which avoids the aforementioned problems associated with foaming of the coating upon application to the golf ball. The coating of the present invention is water-reducible in that the addition of water does not increase the tendency of foaming of the coating. The golf ball coating is formed from about 100 parts of a first component and about 25 parts of a second component, the first component comprising from about 50 parts to about 90 parts of a compound having hydroxyl functionality, from about 0.25 parts to about 2 parts of a water-miscible organic solvent, from about 0.15 parts to about 1 part of a water soluble optical brightener and from about 5 parts to about 20 parts water, and the second component comprising from about 9 parts to about 18 parts of a water dispersible aliphatic polyisocyanate and from about 5 parts to about 12.5 parts of a water-miscible organic solvent. The present invention also provides a method of forming a polyurethane coating on a golf ball from the above-mentioned first and second components comprising combining them, applying the combination to the golf ball, followed by curing of the coating. The present invention also provides a method of forming a golf ball top coat on a golf ball having a SURLYN® outer layer, which avoids the use of a primer coat or an adhesion promoting layer.

DESCRIPTION OF THE PREFERRED EMBODIMENT

The present invention relates to a golf ball coating composition. In addition, the present invention relates to golf balls having a coating formed from such composition and methods of forming such coating. The golf ball coating composition of the present invention is a water-reducible urethane system, comprising two components which are kept separate from one another until the desired time for forming the coating of the present invention. The term "water reducible" as used herein refers to the ability to decrease the viscosity of the coating by adding water to the mixture after combining the first and second components to one another, or by adding water to the first component containing the hydroxyl functional agent as described below. The substantially non-foaming coating is formed by the addition and subsequent reaction of a first component and a second component as follows.

The first component comprises at least one compound having hydroxyl functionality such as a polyurethane polyol, a minor amount of an optional organic solvent, at least one fluoroaliphatic polymeric ester, a polysiloxane copolymer, a water soluble optical brightener, and water. The compound having hydroxyl functionality may be any organic compound having an-OH group including but not limited to alcohols (monohydric, dihydric, trihydric or polyhydric), acrylics, polyesters, vinyls and alkyds or combinations thereof. The compound having hydroxyl functionality is preferably a polyurethane polyol. The term "polyol" as used herein refers to any organic compound having two or more hydroxyl groups. A polyurethane polyol is preferred as it functions as the primary reactant with the polyisocyanate in the second component described below. The polyurethane polyol provides resin solids in the first component and enhances the flexibility, toughness and resistance properties of the resulting coating. Such polyurethane polyols are commercially available and are designated by the weight percent solids in the resin product and the hydroxyl equivalent weight of the compound. The hydroxyl equivalent weight provides a measure of the length of each repeating monomer unit in the resin formulation. A hydroxyl equivalent weight of 2000 for instance indicates that the average molecular weight between hydroxyl groups is 2000 (or that the average molecular weight of a repeating unit having a hydroxyl group is 2000). The most preferred polyurethane polyol has a hydroxyl equivalent weight of about 1500 to about 4000. Such a polyurethane polyol is Polyurethane Polyol BAYHYDROL XP 7044 from Miles Chemicals of Pittsburgh, Penn. Furthermore, it is envisaged that a variety of other hydroxyl functional compounds may be employed instead of or in combination with the polyurethane polyol. Examples include ACRYLOID WR-97, a water-reducible acrylic from Rohm & Haas of Philadelphia, Penn.; AROLON 559, a water-reducible acrylic from Reichhold Chemicals of White Plains, N.Y.; K-FLEX 320W, a polyurethane diol from King Industries of Stanford, Conn.; UCAR BW875, a water-reducible vinyl polyol, available from Union Carbide; CARGILL 72-7289, a water-reducible polyester polyol from Cargill of Minneapolis, Minn.; and BAYHYDROL XP-7056, a water-reducible alkyl polyol from Miles Chemicals.

It is optional to utilize the organic solvent. If one is employed, the preferred organic solvent for use in the first component is a watermiscible solvent such as methyl pyrrolidone or an alcohol such as butyl CELLOSOLVE, which is 2-butoxy-ethanol, available from Union Carbide. It is envisaged that a variety of other related alcohols could be utilized. Methyl pyrrolidone is most preferred. Any of the solvents utilized in the second component described below are suitable for use in the first component. The fluoroaliphatic polymeric ester provides flow and leveling properties to the resulting system. These properties are important during coating formation. The preferred fluoroaliphatic polymeric ester is 3M FC 430, available from Minnesota Mining and Manufacturing Company of St. Paul, Minn. The polysiloxane copolymer is utilized to improve the mar and slip resistance characteristics of the resulting coating. The preferred polysiloxane copolymer is a polyether modified dimethyl-polysiloxane copolymer. Examples of such copolymer include BYK 300 series, available from BYK-Chemie of Wallingford, Conn. The water soluble optical brightener provides the coating with enhanced brightness. The preferred class of compounds for the optical brightener is stilbene 2,2-disulphonic acid salts. The most preferred compound for the optical brightener is a 4,4'-bis-2-diethylamino-4-(2,5 -disulphophenylamino)-S-triazinyl-6-amino-stilbene 2,2'-disulphonic acid, sodium salt, available frozen Ciba-Geigy Corporation of Hawthorne, N.Y., under the designation TINOPAL SFP. The preferred weight proportions for the ingredients in the first component are about 50 parts to about 90 parts by weight of water-based polyurethane polyol, about 0.25 parts to about 2 parts of an organic solvent, about 0.15 parts to about 1 part fluoroaliphatic polymeric ester, about 0.15 parts to about 1 part polysiloxane copolymer, about 0.15 parts to about 1 part water soluble optical brightener, and about 5 parts to about 20 parts water. The most preferred formulation of ingredients in the first component are about 83.3 parts of a water-based polyurethane polyol having 38–42% solids by weight and an average hydroxyl equivalent weight of from about 2450–2550 as supplied, about 0.5 parts methyl pyrrolidone, about 0.2 parts fluoroaliphatic polymeric ester, about 0.2 parts polysiloxane copolymer, about 0.2 parts water soluble optical brightener, and about 15.6 parts water.

The second component comprises a water dispersible aliphatic polyisocyanate and an optional organic solvent. The present inventors have discovered that in order to form the golf ball water-based polyurethane coating of the present invention which avoids the aforementioned problems associated with foaming of the coating upon application to the golf ball, it is necessary to exclude substantially all aromatic isocyanate compounds from the reaction mixture and strictly utilize one or more aliphatic polyisocyanates. The aliphatic polyisocyanate is a co-reactant of the compound having hydroxyl functionality in the first component, so that upon polymerization, they produce the crosslinked matrix structure of the resulting coating. In addition, the polyisocyanate provides the coating with its nonyellowing characteristics. Examples of the aliphatic polyisocyanate include, but are not limited to, linear, branched, or alicyclic hydrocarbons. Representative examples of such hydrocarbons include, but are not limited to, ethylene diisocyanate, trimethylene diisocyanate, tetramethylene diisocyanate, hexamethylene diisocyanate, dodecamethylene diisocyanate, trimethyl hexamethylene diisocyanate, cyclobutane diisocyanate, cyclohexane diisocyanate, and isophorone diisocyanate. Preferred compounds for the water-dispersible polyisocyanate include aliphatic hexamethylene diisocyanate such as 1,6-hexamethylene diisocyanate and 6-hexamethylene diisocyanate. A most preferred aliphatic hexamethylene polyisocyanate is available from Miles Chemicals under the designation BAYHYDUR XP-7007. Other suitable aliphatic polyisocyanates include BAYHYDUR XP 7043 and XP 7063, both available from Miles. The optional organic solvent is employed to improve the application properties of the second component and resulting coating. The present inventors have found that when utilizing BAYttYDUR XP-7007, it is preferable to employ the optional organic solvent to render the resin sufficiently water miscible and dispersible and to enhance the resulting golf ball coating properties. The present inventors have also discovered that it is not necessary to add such solvent when utilizing BAYHYDUR XP 7043 or XP 7063. Although the function of the organic solvent in the second component is not known, it is believed that the solvent may operate in one or more of the following manners. The organic solvent enhances the adhesive and bonding interaction between the substrate and coating formed thereon; the solvent lowers the surface tension of the coating formulation thereby increasing the extent of contact between the substrate and coating formulation; and the solvent affects the drying rate of the coating and so affects the properties of the coating. The present inventors have discovered that in forming a golf ball top coat by spraying a coating formulation, it is preferable to utilize a formulation having a relatively low viscosity, such as a viscosity less than that of viscosity standard liquid C35, available from Cannon Instrument Company of State College, Penn. Thus, by venting the amount and type of organic solvents used in the first and/or second components, the viscosity of the formulation may be tailored to the specific application. The organic solvent may be nearly any water-miscible solvent, including those utilized in the previously described first component, so long as it does not contain a hydroxyl group. The preferred organic solvent for use in the second component is oxyl-hexyl acetate. The preferred amounts of ingredients in the second component are as follows. From about 9 parts to about 18 parts of water dispersible aliphatic polyisocyanate and from about 5 parts to about 12.5 parts organic solvent. The most preferred formulation for the second component is about 15 parts of a water dispersible aliphatic polyisocyanate having 98–100% solids by weight and an average isocyanate equivalent weight of from about 180 to about 300, and about 10 parts solvent. Such aliphatic polyisocyanates are commercially available and are designated by the weight percent solids and isocyanate equivalent weight, in the same manner as the previously described polyols.

Although not wishing to be bound to any particular theory it is believed that the ability of the two component water-based system described herein, to form a protective, aesthetically pleasing golf ball top coat without foaming and thereby avoiding the defects and problems incident thereto, results from the present inventors' discovery of the particular combination of ingredients described herein, and selection and use of an aliphatic polyisocyanate. The present inventors have discovered that by careful selection of a water-dispersible aliphatic polyisocyanate, in conjunction with the other components listed herein, in their particular proportions, a superior water reducible polyurethane golf ball top coat is obtained which does not foam. It is believed that the reaction between the hydroxyl functional compound (e.g. polyurethane polyol) in the first component and the aliphatic polyisocyanate in the second component proceeds at a rate which is significantly greater than the competing reaction between water and the aliphatic polyisocyanate. The difference in rates is such that the generation of carbon dioxide gas from the water reaction is negligible and foaming does not occur. Moreover, the present inventors have discovered that by forming the coatings of the present invention in one or more relatively thin layers as described in greater detail below, the water which is introduced into the coating from the first component is quickly driven from the coating prior to or during curing so that formation and capture of carbon dioxide gas is minimized or avoided. Furthermore, the first component has an exceedingly long shelf life prior to its addition to the second component. The second component also has a long shelf life prior to its addition to the first component or a hydroxyl functional compound.

The coating of the present invention is made by adding the second component to the first component while mixing. The preferred weight ratio of the first component to the second component is about 100 parts to about 25 parts, respectively. This ratio will yield an isocyanate to hydroxyl molar ratio of approximately 2:1. It is preferred to react the polyurethane polyol in a molar ratio of NCO:OH of at least about 1.8:1. The viscosity of the resulting mixture may be adjusted by subsequent additions of water. The present inventors have surprisingly found that by use of the particular combination of ingredients described herein, and especially that of an aliphatic polyisocyanate, the viscosity of the resulting coating composition may be readily lowered by adding water without increasing the potential for formation of carbon dioxide gas.

Various other acrylic, water-based epoxies, and epoxy functional resins may be blended or reacted with the two component system described herein to improve coating quality and enhance performance characteristics. Moreover, it is envisioned that various agents and additives such as, but not limited to, defoamers, curing catalysts, fillers, dyes, plasticizers, waxes, U.V. stabilizers, coalescing solvents such as n-vinyl 2-pyrrolidone, n-methyl 2-pyrrolidone, and butyl CELLOSOLVE, may be added to modify the properties of the resulting coating. In addition, an optical brightener such as TINOPAL SFP, available from Ciba-Geigy Corporation of Hawthorne, N.Y., may be added preferably in a concentration between about 1% and about 4% based upon the dry weight of the coating.

In addition to forming a clear golf ball top coat, the present invention may also be used to provide a pigmented golf ball coating. There are generally three colorings or pigmenting agents utilized for golf ball coatings: white, fluorescent orange, and fluorescent yellow. Moreover, other pigmenting agents could be utilized instead of or in combination with white, fluorescent orange, and fluorescent yellow. Accordingly, there is a wide array of types and suppliers of each of those colorants. In forming a white pigmented coating, it is preferred to utilize $TiO_2$ as the pigment. Pigment may be added to the first component, generally in such amounts as may be necessary to provide the desired coloring to the resulting coating. For a white coating based upon 50–90 parts of BAYHYDROL XP 7044 in the first component as previously described, $TiO_2$ is added in an amount of from about 10 parts to about 60 parts by weight to the first component. The present inventors envisage the possibility of using higher amounts of $TiO_2$ in order to vary the characteristics (e.g. whiteness, hiding power, etc.) of the resulting coating.

The formation of the polyurethane top coat of the present invention upon a golf ball is as follows. After preparing the first and second components as described herein, and after adding the components to one another in the desired proportions, the resulting mixture is applied onto the outer surface of a golf ball. The golf ball may be any type of golf ball having an outer layer formed from an assortment of materials including, but not limited to, SURLYN®, urethane, balata or generally any polymeric material. The uncured or partially cured coating mixture may be applied to the golf ball in a variety of fashions including spraying, dipping, pouring, brushing and wiping. It is preferred to apply the mixture by spraying onto the golf ball surface. Coating thicknesses may be varied by adjusting the viscosity of the uncured coating mixture, environmental conditions (e.g. temperature), rate of application, rate of curing or polymerization of the coating upon application to the golf ball, and use of multiple coats. For single applications, the present inventors have found that the preferred amount or thickness of the uncured coating mixture after application to the golf ball is from about 100 to about 250 milligrams per ball. Such values are typically referred to in the industry as the "wet film weight". Upon curing and/or drying, the "dry film weight" is generally from about 60 to about 150 milligrams per ball. If a plurality of thin layers are applied to form the golf ball top coat, it is preferred to adjust the thickness of each layer so that the total amount of coating applied in the plurality of layers is within the aforementioned range.

Curing of the coating after deposition to the golf ball occurs by polymerization between the compound having hydroxyl functionality (e.g. polyurethane polyol) in the first component and the aliphatic polyisocyanate in the second component. Surprisingly, it has been found that such curing may be performed at ambient temperature. As previously noted, it is believed that in-situ polymerization of the coating occurs after application to the golf ball and results in a superior coating as opposed to "one pack" systems. Polymerization is allowed to proceed until equilibrium of the system is reached and the coating is dried to remove the water and organic solvents from the system. Heat may be employed to accelerate both the polymerization and drying phases of the curing operation.

As far as is known by the present inventors, all golf ball top coats for SURLYN® covered golf balls require a primer coat or adhesion promoting layer deposited on the SURLYN® material. The SURLYN® materials are a class of polymeric materials which are ionic copolymers. Those ionic copolymers are sodium or zinc salts of the reaction product of an olefin having 2 to 8 carbon atoms such as ethylene and an unsaturated monocarboxylic acid having from 3 to 8 carbon atoms. The present inventors have surprisingly found that the golf ball top coat formulation described herein does not require such a primer coat or adhesion promoting layer prior to its application to a SURLYN® golf ball. Surprisingly, the top coat formulation of the present invention bonds to the SURLYN® material with sufficient strength to avoid flaking off or cracking when subjected to stress or aging. The direct application of the top coat formulation of the present invention eliminates the associated cost and time otherwise required in forming and applying a primer or adhesion promoting layer to a SURLYN® golf ball, and thus is envisaged by the present inventors to be of great commercial importance.

Of course, it is understood that time foregoing is merely a preferred embodiment of the invention and that various changes and alterations can be made without departing from the spirit and broader aspects thereof as set forth in the appended claims, which are to be interpreted in accordance with the principals of patent law, including the doctrine of equivalents.

The embodiments of the invention in which an exclusive property or privilege is claimed are defined as follows:

1. A golf ball having a two component water-based polyurethane coating formed from about 100 parts of a first component and about 25 parts of a second component, wherein said first component comprises:

from about 50 parts to about 90 parts of a compound having hydroxyl functionality;

from about 0.25 parts to about 2 parts of a first water-miscible organic solvent;

from about 0.15 parts to about 1 part of a water soluble optical brightener; and from about 5 parts to about 20 parts water; and said second component comprises:

from about 9 parts to about 18 parts of a water dispersible aliphatic polyisocyanate; and from about 5 parts to about 12.5 parts of a second water-miscible organic solvent.

2. A golf ball in accordance with claim 1 wherein said compound having hydroxyl functionality is selected from the group consisting of alcohol, acrylic, polyester, vinyl, alkyd, and combinations thereof.

3. A golf ball in accordance with claim 2 wherein said alcohol is a polyurethane polyol.

4. A golf ball in accordance with claim 3 wherein said polyurethane polyol is reacted with said polyisocyanate in a molar ratio of NCO:OH of at least about 1.8:1.

5. A golf ball in accordance with claim 1 wherein said first organic solvent is selected from the group consisting of methyl pyrrolidone and an alcohol.

6. A golf ball in accordance with claim 1 wherein said first component further comprises:

from about 0.15 parts to about 1 part of a fluoroaliphatic polymeric ester and from about 0.15 parts to about 1 part of a polysiloxane copolymer.

7. A golf ball in accordance with claim 6 wherein said polysiloxane copolymer is a polyether modified dimethylpolysiloxane copolymer.

8. A golf ball in accordance with claim 6 wherein said first component comprises about 83.3 parts of said water-based polyurethane polyol, about 0.5 parts of said first organic solvent, about 0.2 parts of said fluoroaliphatic polymeric ester, about 0.2 parts of said polysiloxane copolymer, about 0.2 parts of said water soluble optical brightener, and about 15.6 parts water, and said second component comprises about 15 parts of said water dispersible aliphatic polyisocyanate and about 10 parts of said second organic solvent.

9. A golf ball in accordance with claim 1 wherein said water soluble optical brightener is a stilbene 2,2-disulphonic acid salt.

10. A golf ball in accordance with claim 9 wherein said water soluble optical brightener is 4,4'-bis-2-diethylamino-4-(2,5-disulpho-phenylamino)-S-triazinyl-6-amino-stilbene 2,2'-disulphonic acid, sodium salt.

11. A golf ball in accordance with claim 1 wherein said water dispersible aliphatic polyisocyanate is selected from the group consisting of ethylene diisocyanate, trimethylene diisocyanate, tetramethylene diisocyanate, hexamethylene diisocyanate, dodecamethylene diisocyanate, isophorone diisocyanate, trimethyl hexamethylene diisocyanate, cyclobutane diisocyanate and cyclohexane diisocyanate.

12. A golf ball in accordance with claim 1 wherein said second organic solvent is oxyl-hexyl acetate.

13. A golf ball in accordance with claim 1 wherein said first component further comprises a pigmenting agent.

14. A golf ball in accordance with claim 13 wherein said pigmenting agent is $TiO_2$ and exists in said first component in a ratio of from about 10 to about 60 parts per every 50 to 90 parts of said compound having hydroxyl functionality.

15. A method of forming a polyurethane coating on a golf ball from a two component water-based polyurethane system, said method comprising:

forming a first component comprising from about 50 parts to about 90 parts of a compound having hydroxyl functionality, from about 0.25 parts to about 2 parts of a first water-miscible organic solvent, from about 0.15 parts to about 1 part of a water soluble optical brightener, and from about 5 parts to about 20 parts water;

forming a second component comprising from about 9 parts to about 18 parts of a water dispersible aliphatic polyisocyanate, and from about 5 parts to about 12.5 parts of a second water-miscible organic solvent;

combining said first component and said second component;

applying said combined first and second components to said golf ball to form said polyurethane coating; and curing said coating.

16. A method of forming a polyurethane coating on a golf ball in accordance with claim 15 wherein said compound having hydroxyl functionality is selected from the group consisting of alcohol, acrylic, polyester, vinyl, alkyd and combinations thereof.

17. A method of forming a polyurethane coating on a golf ball in accordance with claim 16 wherein said alcohol is a polyurethane polyol.

18. A method of forming a polyurethane coating on a golf ball in accordance with claim 17 wherein said polyurethane polyol is reacted with said polyisocyanate in a molar ratio of NCO:OH of at least about 1.8:1.

19. A method of forming a polyurethane coating on a golf ball in accordance with claim 16 wherein said first organic solvent is selected from the group consisting of methyl pyrrolidone and an alcohol.

20. A method of forming a polyurethane coating on a golf ball in accordance with claim 15 wherein said water soluble optical brightener is a 2,2-disulphonic acid salt.

21. A method of forming a polyurethane coating on a golf ball in accordance with claim 20 wherein said water soluble optical brightener is 4,4'-bis-2-diethylamino-4-( 2,5-disulpho-phenylamino)-S-triazinyl-6-amino-stilbene 2,2'-disulphonic acid, sodium salt.

22. A method of forming a polyurethane coating on a golf ball in accordance with claim 15 wherein said water dispersible aliphatic polyisocyanate is selected from the group consisting of ethylene diisocyanate, trimethylene diisocyanate, tetramethylene diisocyanate, hexamethylene diisocyanate, dodecamethylene diisocyanate, isophorone diisocyanate, trimethyl hexamethylene diisocyanate, cyclobutane diisocyanate and cyclohexane diisocyanate.

23. A method of forming a polyurethane coating on a golf ball in accordance with claim 15 wherein said second organic solvent is oxyl-hexyl acetate.

24. A method of forming a polyurethane coating on a golf ball in accordance with claim 15 wherein said first component and said second component are combined in a ratio of about 100 parts to about 25 parts, respectively.

25. A method of forming a polyurethane coating on a golf ball in accordance with claim 15 wherein said coating is applied onto said golf ball to a wet weight of from about 100 milligrams to about 250 milligrams per golf ball.

26. A method of forming a polyurethane coating on a golf ball in accordance with claim 15 wherein said curing step is performed by drying said coating.

27. A method of forming a polyurethane coating on a golf ball in accordance with claim 26 wherein said coating is dried to a dry weight of from about 60 milligrams to about 150 milligrams per golf ball.

28. A method of forming a polyurethane coating on a golf ball in accordance with claim 15 wherein said curing step is performed by heating said coating.

29. A method of forming a polyurethane coating on a golf ball in accordance with claim 15 wherein said first component further comprises:

from about 0.15 parts to about 1 part of a fluoroaliphatic polymeric ester and from about 0.15 parts to about 1 part of a polysiloxane copolymer.

30. A method of forming a polyurethane coating on a golf ball in accordance with claim 29 wherein said polysiloxane copolymer is a polyether modified dimethyl-polysiloxane copolymer.

31. A method of forming a polyurethane coating on a golf ball in accordance with claim 29 wherein said first component comprises about 83.3 parts of said polyurethane polyol, about 0.5 parts of said first organic solvent, about 0.2 parts of said fluoroaliphatic polymeric ester, about 0.2 parts of said polysiloxane copolymer, about 0.2 parts of said water soluble optical brightener, and about 15.6 parts water, and said second component comprises about 15 parts of said water dispersible aliphatic polyisocyanate and about 10 parts of said second organic solvent.

32. A method of forming a golf ball top coat on a golf ball having an outer layer formed from an ionic copolymer which is a sodium or zinc salt of the reaction product of an olefin having 2 to 8 carbon atoms and an unsaturated monocarboxylic acid having from 3 to 8 carbon atoms, wherein said method avoids the use of a primer coat or an adhesion promoting layer deposited upon said golf ball outer layer, said method comprising:

forming a first component comprising from about 50 parts to about 90 parts of a compound having hydroxyl functionality, from about 0.25 parts to about 2 parts of a first water-miscible organic solvent, from about 0.15 parts to about 1 part of a water soluble optical brightener, and from about 5 parts to about 20 parts water;

forming a second component comprising from about 9 parts to about 18 parts of a water dispersible aliphatic polyisocyanate, and from about 5 parts to about 12.5 parts of a second water-miscible organic solvent;

combining said first component and said second component;

applying said combined first and second components to said golf ball outer layer to form said golf ball top coat; and curing said golf ball top coat.

33. A method of forming a golf ball top coat on a golf ball in accordance with claim 32 wherein said compound having hydroxyl functionality is selected from the group consisting of alcohol, acrylic, polyester, vinyl, alkyd, and combinations thereof.

34. A method of forming a golf ball top coat on a golf ball in accordance with claim 33 wherein said alcohol is a polyurethane polyol.

35. A method of forming a golf ball top coat on a golf ball in accordance with claim 34 wherein said polyurethane polyol is reacted with said polyisocyanate in a molar ratio of NCO:OH of at least about 1.8:1.

36. A method of forming a golf ball top coat on a golf ball in accordance with claim 32 wherein said first organic solvent is selected from the group consisting of methyl pyrrolidone and an alcohol.

37. A method of forming a golf ball top coat on a golf ball in accordance with claim 32 wherein said water soluble optical brightener is a stilbene 2,2-disulphonic acid salt.

38. A method of forming a golf ball top coat on a golf ball in accordance with claim 37 wherein said water soluble optical brightener is 4,4'-bis-2-diethylamino-4-( 2,5-disulpho-phenylamino)-S-triazinyl-6-amino-stilbene 2,2'-disulphonic acid, sodium salt.

39. A method of forming a golf ball top coat on a golf ball in accordance with claim 32 wherein said water dispersible aliphatic polyisocyanate is selected from the group consisting of ethylene diisocyanate, trimethylene diisocyanate, tetramethylene diisocyanate, hexamethylene diisocyanate, dodecamethylene diisocyanate, isophorone diisocyanate, trimethyl hexamethylene diisocyanate, cyclobutane diisocyanate and cyclohexane diisocyanate.

40. A method of forming a golf ball top coat on a golf ball in accordance with claim 32 wherein said second organic solvent is oxyl-hexyl acetate.

41. A method of forming a golf ball top coat on a golf ball in accordance with claim 32 wherein said first component and said second component are combined in a ratio of about 100 parts to about 25 parts, respectively.

42. A method of forming a golf ball top coat on a golf ball in accordance with claim 32 wherein said coating is applied onto said golf ball to a wet weight of from about 100 milligrams to about 250 milligrams per golf ball.

43. A method of forming a golf ball top coat on a golf ball in accordance with claim 32 wherein said curing step is performed by drying said coating.

44. A method of forming a golf ball top coat on a golf ball in accordance with claim 43 wherein said coating is dried to a dry weight of from about 60 milligrams to about 150 milligrams per golf ball.

45. A method of forming a golf ball top coat on a golf ball in accordance with claim 32 wherein said curing step is performed by heating said coating.

46. A method of forming a golf ball top coat on a golf ball in accordance with claim 32 wherein said first component further comprises:

from about 0.15 parts to about 1 part of a fluoroaliphatic polymeric ester and from about 0.15 parts to about 1 part of a polysiloxane copolymer.

47. A method of forming a golf ball top coat on a golf ball in accordance with claim 46 wherein said polysiloxane copolymer is a polyether modified dimethyl-polysiloxane copolymer.

48. A method of forming a golf ball top coat on a golf ball in accordance with claim 47 wherein said first component comprises about 83.3 parts of said polyurethane polyol, about 0.5 parts of said first organic solvent, about 0.2 parts of said fluoroaliphatic polymeric ester, about 0.2 parts of said polysiloxane copolymer, about 0.2 parts of said water soluble optical brightener, and about 15.6 parts water, and said second component comprises about 15 parts of said water dispersible aliphatic polyisocyanate and about 10 parts of said second organic solvent.

\* \* \* \* \*